Oct. 31, 1967  J. B. PLEVYAK  3,349,656
LATHE CUT-OFF DEVICE
Filed Feb. 17, 1964  8 Sheets-Sheet 1

INVENTOR.
Joseph B. Plevyak
BY
Polachek & Saulsbury
ATTORNEYS

Oct. 31, 1967  J. B. PLEVYAK  3,349,656
LATHE CUT-OFF DEVICE
Filed Feb. 17, 1964  8 Sheets-Sheet 3

INVENTOR.
Joseph B. Plevyak
BY
Polachek & Saulsbury
ATTORNEYS

Oct. 31, 1967  J. B. PLEVYAK  3,349,656
LATHE CUT-OFF DEVICE

Filed Feb. 17, 1964  8 Sheets-Sheet 4

INVENTOR.
Joseph B. Plevyak
BY
Polachek & Saulsbury
ATTORNEYS

Oct. 31, 1967  J. B. PLEVYAK  3,349,656
LATHE CUT-OFF DEVICE
Filed Feb. 17, 1964  8 Sheets-Sheet 7

INVENTOR.
Joseph B. Plevyak
BY
Polachek & Saulsbury
ATTORNEYS

Oct. 31, 1967   J. B. PLEVYAK   3,349,656
LATHE CUT-OFF DEVICE

Filed Feb. 17, 1964   8 Sheets-Sheet 8

INVENTOR.
Joseph B. Plevyak
BY
Polachek & Saulsbury
ATTORNEYS

United States Patent Office 3,349,656
Patented Oct. 31, 1967

3,349,656
LATHE CUT-OFF DEVICE
Joseph B. Plevyak, 19 Jefferson St., Newton, N.J. 07860
Filed Feb. 17, 1964, Ser. No. 345,200
4 Claims. (Cl. 82—101)

This invention relates to a cam actuated tool with tool and work spindles.

The invention relates to all types of tools and spindles, turret lathe or otherwise, that will lend themselves to be moved or rotated by a cam actuated slidable pusher bar or lever, directly, or, through a gear train arrangement.

Specific and precise movements and rotations are transmitted from a cam lobe, designed and calculated to produce movements only in work position and during the period of a particular operation. This eliminates constant movement or rotation, reducing friction, heat, wear, auxiliary drive units, etc., resulting in a simplified and efficient machine tool setup.

A principal object of the invention is to provide new and useful improvement in a tool assembly of the kind described that is highly efficient in performing multiple operations, dead center tool pressures, cut off burr removal and back end operations, cross drilling and tapping operations, etc., and operating only in a work position.

Another object of the invention is to provide a tool assembly of this kind that is sturdy and simple in construction and economical to manufacture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 6A is a side elevational view, and FIG. 6AA is a front elevational view of the knurling member of FIG. 6.

FIG. 7 is a side elevational view of another modified form of tool adapted to be used with the device of FIG. 1.

FIG. 8 is a front elevational view thereof as seen from the line 8—8 of FIG. 7.

FIG. 9 is a side elevational view of still another modified form of tool adapted to be used with the device of FIG. 1.

FIG. 10 is a front elevational view thereof as seen from the line 10—10 of FIG. 9.

FIG. 11 is a side elevational view of yet another modified form of tool adapted to be used with the device of FIG. 1.

FIG. 12 is a front elevational view of FIG. 11.

FIG. 13 is a side elevational view of a turret lathe adjustable knurling tool assembly embodying another modified form of the invention.

FIG. 14 is a front elevational view thereof as seen from the line 14—14 of FIG. 13.

FIG. 15 is a front view of the tool body of FIG. 14 with supported gears.

FIG. 16 is a sectional view taken on the line 16—16 of FIG. 15.

FIG. 23 is a vertical sectional view taken on the line 23—23 of FIG. 22.

FIG. 28 is a vertical sectional view taken on the line 28—28 of FIG. 27.

FIG. 31 is a vertical sectional view taken on the line 31—31 of FIG. 32 of a turret slotting and milling tool assembly embodying a still further modified form of the invention.

FIG. 32 is a vertical sectional view taken on the line 32—32 of FIG. 31.

FIG. 33 is a front elevational view of a turret cross drilling tool assembly embodying yet a further modified form of the invention, a work piece being shown in position.

FIG. 34 is a side elevational view thereof, parts being shown broken away.

FIG. 35 is a sectional view showing the drill mounting of FIG. 33.

FIG. 40 is a bottom plan view of the tool as seen from the line 40—40 of FIG. 39.

FIG. 41 is an end view of the tool as seen from the line 40—40 of FIG. 40.

FIG. 42 is a diagrammatic view showing a modified form of drive for a machine spindle, both forward and reverse.

Figure 1:
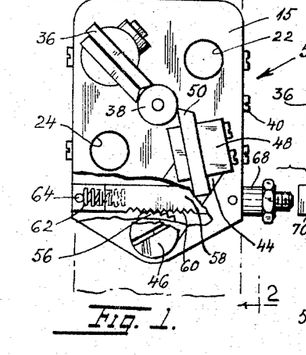
FIG. 1 is a front elevational view of a swing tool assembly embodying the invention, on a turret lathe, a work piece being shown in position, a guide being shown in operative position therewith.
Figure 2:
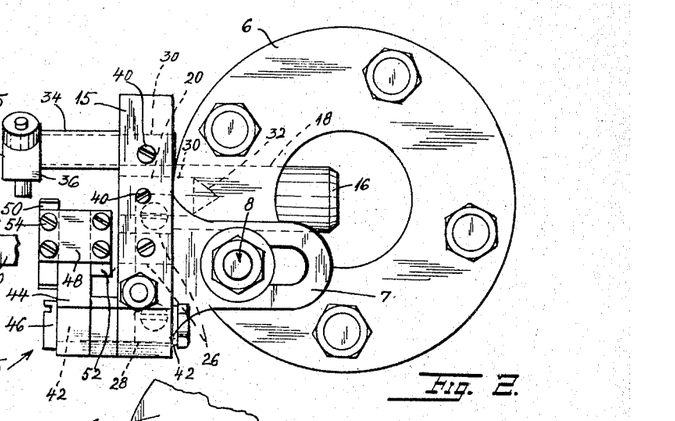
FIG. 2 is a side view as seen along the line 2—2 of FIG. 1, the work-piece being omitted.

Referring now in detail to the drawings, in FIG. 1 there is shown a tool assembly 5 capable of selectively supporting cutting, knurling, turning, grooving or recessing swing tool members. The tool assembly is shown adjustably mounted in a turret 6 for swinging therewith, by means of a slotted bracket 7, the assembly being locked in position by a bolt and nut assembly 8 extending through the slot of the bracket and into a deep recess 9 in the turret 6. The bolt and nut assembly includes a bushing member 10 in the recess 9 and a nut member 11 in the recess in alignment with the bushing member. A threaded bolt 12 extends through the bushing member and nut member. The inner end edge of the bushing member is formed with a notch 13 having a tapering wall, while the adjacent end of the nut member is formed with a notch 14 having a curved wall. The turret 6 is formed with a plurality of spaced tool-holding holes 18.

The tool assembly 5 comprises a tool body constituted by a heavy rectangular plate 15, with smooth surfaces on both sides. A shank 16 extends radially from one side of the plate, at the center thereof. The shank is positioned slightly above midlength thereof. Shank 16 is formed with a flat surface 17 which is adapted to seat in the adjacent notches 13 and 14 of the bushing and nut member so that upon setting up on the bolt 12 the shank will be held in position and the tool assembly locked against turning movement.

The plate 15 is formed with a plurality of holes, to wit, a pair of spaced holes 20 and 22, a pair of intermediate holes 24 and 26, and a bottom center hole 28. The holes constitute stations for receiving various types of operating tool members. Another hole 30 is formed in the plate between the pairs of holes and centrally of the plate, which hole is aligned with a recess 32 in the shank 16.

In hole 20, the shank 34 of a back rest 36, for supporting a work piece 38, is clamped in supported position in tool body 15 by a set screw 40.

In hole 28, a stub shaft 42 is rotatably mounted, and secured to the shaft and carried around thereby is a rectangular-shaped block-like arm 44. Shaft 42 is received in a round hole at one end of the block-like arm and the arm is secured thereon in a set (key) position by a screw 46 extending axially into the shaft. A block 48 is suitably fixed on the other free end of the arm and carried thereby in angular position relative to the arm is a pair of cutting knives 50 and 52 secured by set screws 54. The arm 44 is adapted to be swung manually on the shaft 42 toward and away from the work piece 38 supported by the back rest 36, and is adapted to be inverted readily for right or left-hand operations.

The means for swinging the arm 44 includes a pinion 56 fixed on the shaft 42. A rack bar 58 is slidably mounted in the plate 15 in a horizontal plane with its teeth 60 in mesh with the teeth of the pinion 56 so that movement of the bar is transmitted to pinion 56 and from the wheel or pinion to the shaft 42 thereby swinging the arm 44 with its knives 50 and 52. A compression spring 62 interposed between the end of the bar and a pin 64 urges the bar outwardly or to the right as viewed in FIG. 1 and the knives away from the work piece when not in use. Spring 62 also returns the entire arm assembly when not in use.

In use, when the tool assembly is clamped to the turret 6 the arm 44 is in position ready to bring the knives 50 and 52 to the center line of the work piece 38 for the necessary cutting operations thereon. The arm 44 is moved by an actuating rod 68 automatically moved by a fixed guide 70 which is mounted on a cam-actuated front cross slide (not shown). The rod 68 may, however, also be pressed against the guide by the forward movement of the turret slide or cross slide for tapering operations, etc. When not in use, the arm 44 is held away from the work piece 38 by the coil spring 62.

Figures 3, 4, 5, 6:
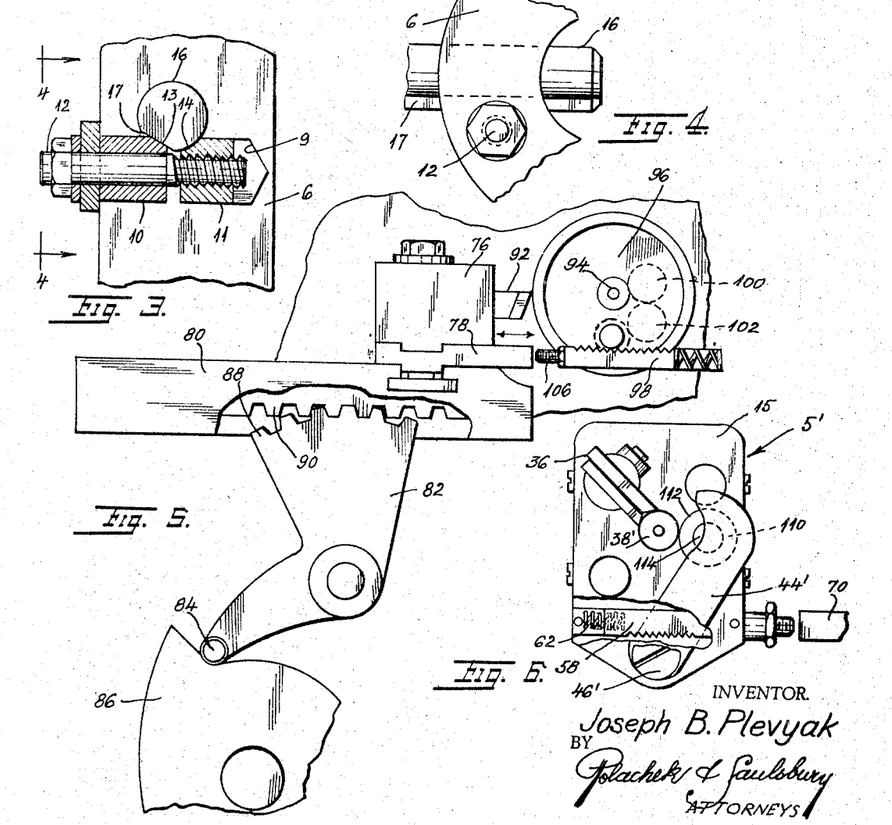
FIG. 3 is a fragmentary sectional view showing the mechanism for locking the shank of the tool in position against radial movement.
FIG. 4 is a fragmentary side view as seen from the line 4—4 of FIG. 3 showing modified mechanism for holding the shank of the tool against radial movement.
FIG. 5 is a fragmentary side elevational view showing mechanism for driving a modified form of cutting-off tool, parts being shown broken away.
FIG. 6 is a view similar to FIG. 1 showing a knurling member embodied in the tool in place of the cutting-off knife.

In FIG. 5, modified mechanism for driving swing tools and revolving tools is shown. This mechanism includes a tool post 76 mounted on a fixed guide 78 which is mounted on a cross slide 80. This is standard machine mechanism. The cross slide is moved by means of a bell crank lever 82, with roller 84, actuated by a cam 86. Teeth 88 on the lever mesh with teeth 90 on the cross slide thereby imparting movement to the cross slide.

The tool post 76 supports a cutting knife 92 which is adapted to operate on a work piece 94 supported on a spindle chuck 96. The knife is shown in retracted position. Bar 98 is moved by an actuating rod 106 automatically moved by the fixed guide 78 which is mounted on cross slide 80, thereby imparting movement to the swing tools, and/or rotation through meshing gears 100 and 102 to revolving tools.

The tool assembly 5' shown in FIG. 6 is similar to the tool assembly 5 of FIG. 1 except that a knurling tool member is mounted on shaft 42 instead of a cutting tool member. The knurling tool member comprises an arm 44' formed at one end with a round hole to receive the shaft 42 and is fixed on the shaft by the screw 46'. The other end of the arm 44' is curved and formed with a recess 110 intersecting one long edge of the arm. A knurl or roll 112 is fixed on a shaft 114 which is journalled in the side walls of the recess 110. The roll 112 is positioned in the recess 110 but projects outwardly of the recess in order to contact the work piece 38'.

When the tool assembly is clamped in the turret, the pivoting point of the arm 44' is so positioned that the roll 112 is in a position to swing into the center line of the work piece 38'.

In FIGS. 7 to 12, inclusive, various types of operating tool members adapted to be used in the tool assembly 5 of FIG. 1 are illustrated.

Figures 6, 6A, 7, 8, 9, 10, 11, 12, 13, 14, 15, 16:
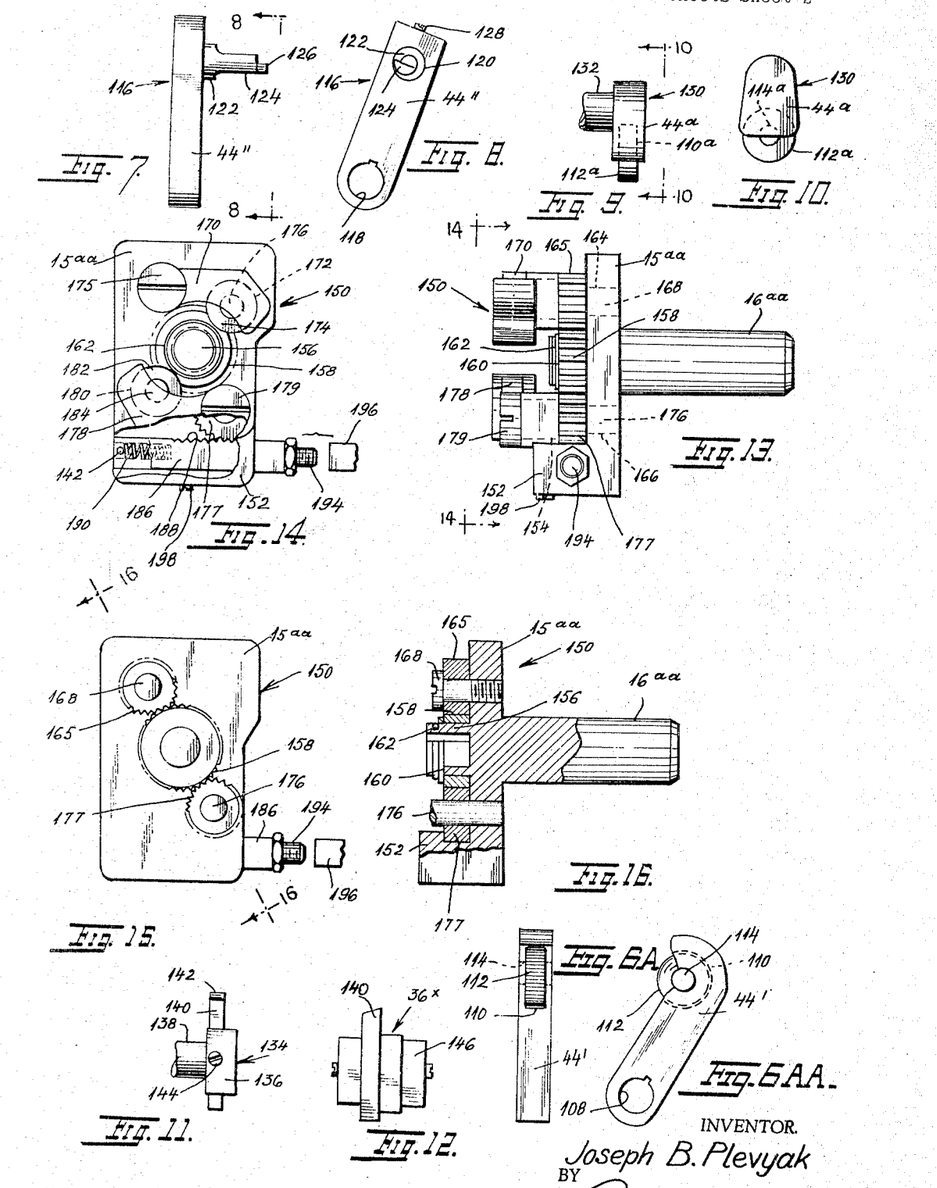

A grooving or recessing tool member 116 is shown in FIGS. 7 and 8. Tool member 116 comprises an arm 44'' similar to arm 44 of the cutting tool member of FIG. 1, with a round hole 118 in one end thereof to receive the shaft 42. A socket 120 is formed in the other end of the arm to receive the round body portion 122 of a semi-round cutter 124 with an extension 126. A set screw 128 holds the cutter in the socket. When the arm is supported on the shaft 42, the cutter 124 is in a position to swing into the center line of the work piece.

A knurling and roller back rest tool member 130 is shown in FIGS. 9 and 10. Tool member 130 comprises a substantially rectangular block-like arm 44a formed with a laterally extending shank 132. The long edges of the arm taper slightly downwardly and outwardly and the bottom wider end of the arm is formed with a central recess 110a intersecting the bottom end edge. A straight thread knurl or roll 112a is fixed on a shaft 114a which is journalled in the wall of the recess 110a. The roll is positioned in the recess but projects outwardly of the recess in order to contact the work piece. The roll 112a is in a position to be swung into the center line of the work piece.

A turning, burnishing, back rest, etc., tool member 134 is shown in FIGS. 11 and 12. Tool member 134 includes a rectangular-shaped body 136 having a laterally extending round shank 138. The body is formed with a passage to receive a turning tool member or arm 140 with a cutting edge 142. The tool member is help in position by a set screw 144.

In FIG. 12, a front view of the tool member 134 of FIG. 11 is shown including a device 36x which is a block or spacer reversible with cutter member 140. The device 36x can be used as a back rest such as the rest 36 of FIG. 1. This back rest or turning tool has a cylindrical stepped body 146 supporting the projecting arm 140 adapted to contact the work piece to be supported, or for turning on back rest tools. Tools fixed in the center hole are used for drilling, center drilling, etc.

In FIGS. 13 to 16, inclusive, a combination swing knurl, thread roll and adjustable knurl tool assembly 150 is shown. The tool assembly 150 comprises a heavy rectangular-shaped plate-like body 15aa. The bottom end of the body extends forwardly as indicated at 152 forming a shelf 154. An integral shank 16aa extends radially from the body 15aa, at the rear thereof.

Centrally and midway its ends, the body at the front is formed with an integral extension, round in cross section, forming a bearing 156 above the shelf for an idler gear 158. The gear is held in position thereon by a washer 160 and a split snap retaining ring 162.

A hole 164 is formed in the plate body 15aa adjacent one end thereof, the top end as viewed in FIG. 13, to one side of the center line of the body, and a similar hole 166 is formed adjacent the other or bottom end and to the other side thereof. A stud shaft 168 is mounted in hole 164 and an arm 170 is rotatably mounted on shaft 168. A pinion 165 is mounted on the inner end of arm 170 and meshes with an idler gear 158. One end of the arm is formed with a recess 172, intersecting one long edge of the arm. A knurl or roll 174 is fixed on a shaft 176 journalled in the side walls of the recess. The roll is positioned in the recess but extends outwardly in order to contact the work piece. A stud 168 rotatably holds the arm and pinion to the tool body 15aa.

A stud shaft 176 is mounted in hole 166 and fixed on the inner end of the shaft there is a pinion 177 in mesh with the gear 158, and outwardly of the pinion on the shaft there is one end of an arm 178, the other end of the arm being formed with a recess 180 therein intersecting one long edge of the arm. A screw 179 holds the pinion and arm on the shaft. A knurl or roll 182 is fixed on a shaft 184 journalled in the walls of the recess. The roll 182 is positioned in the recess but extends outwardly thereof in order to contact the work piece. The rolls 174 and 182 are in angular opposed relation as seen in FIG. 14, outwardly of the plane of the gear and pinions.

The means for swinging the arms 170 and 178 includes a rack bar 186 slidably mounted in the forward extension 152 at the bottom of the plate body, with its teeth 188 in mesh with the teeth on the pinion 177 so that movement of the bar is transmitted to the pinion 177 and from the pinion to the idler gear 158 and from the gear to the pinion 165 thereby simultaneously swinging both arms 170 and 178 with their knurls or rolls 174 and 182. A coil spring 190 between the end of the bar and a pin 192 in the extension of the plate urges the bar outwardly and the knurls away from the work piece when not in use. The rack bar 186 is moved by an actuating rod 194 automatically moved by a fixed guide 196 mounted on a cam-actuated front cross slide (not shown).

In this form of tool assembly 150, the arms or tool holders moving from opposite directions produce a dead center pressure on the work piece diameter.

Furthermore, in this form of tool assembly 150, the tool assembly may be transformed into an adjustable knurl tool by omitting the bar 186 and turning the adjusting screw 198, which is in adjustable contact with arm 178 and through idler gear 158 to the other arm 170, for fast, precise, one-point adjustment on the work piece.

In FIGS. 17 to 21, inclusive, there is a further modified form of tool assembly in the form of a cut-off burr shaving tool assembly 5xx. The tool assembly 5xx comprises a substantially rectangular-shaped heavy plate body 15xx having a radial shank 16xx at the rear. The plate body is formed with an integral extension 199 at the bottom front thereof.

Figure 17:
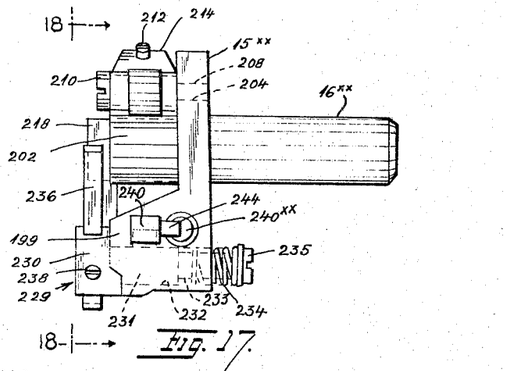
FIG. 17 is a side elevational view of a burr cutting-off and shaving tool assembly embodying yet a further modified form of the invention.
Figure 18:
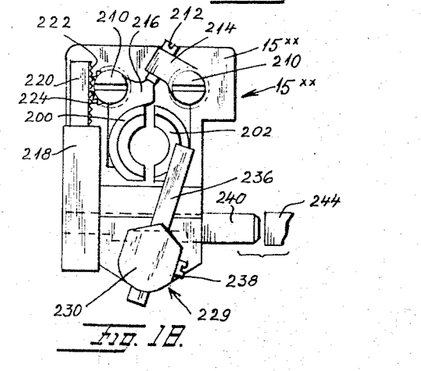
FIG. 18 is a front elevational view thereof as seen from the line 18—18 of FIG. 17.

A pair of opposed split chuck jaws 200, 202 is pivotally mounted on stub shafts 204 journalled in holes 208 in the plate 15xx. Screws 210 hold the chuck jaws on the shafts. A screw 212 carried by an arm 214 on chuck jaw 202 is adapted to engage an extension 216 on chuck jaw 200 for adjusting the chuck jaws.

An enlargement 218 fastened on the front of the plate at one side thereof slidably supports a vertically disposed rack bar 220. The teeth 222 of the bar 220 mesh with a pinion 224 mounted on the shaft 204 of jaw 200. A closed slot 226 is formed in the bar 220 adjacent its bottom end and mounted in the slot is a roller 228 reversible for opposite hand operation.

A cutter or knife unit 229 is pivotally mounted on the forward extension 199 of the plate 15xx to sweep across the rear end of a work piece (not shown) supported by the chuck jaws 200 and 202. The cutter or knife unit includes a substantially round block body 230 having a shank or stem 231 rotatably mounted in a socket opening 232 extending from the front to the rear of the extension 199 of the plate 15xx. The rear end of the shank or stem 231 is reduced in diameter, and sleeved around the reduced end there is a retractable compression spring 234, FIG. 17 one end of which seats on a shoulder of a fixed bushing 233 and the other end impinges against a screw 235 threaded into an axial socket in the reduced end of the stem. An elongated knife or cutter 236 is slidably mounted in a passage 237 in said body and is held therein by a set screw 238.

The means for swinging the cutter 236 comprises a round pusher bar 240 slidably mounted in a passage 242 disposed across the extension 199 on the plate 15xx. The bar is adapted to be actuated by a portion of a fixed guide 244 mounted on a cam-actuated front cross slide (not shown). Pusher bar 240 is formed with an elongated shallow notch 246 along one long edge thereof, the bottom edge as viewed in FIGS. 20 and 21 and is also formed with steps 248, 249 and 250 at the inner end of said bottom edge. The stepped end of the pusher bar rides in the roller 228. A radial lug or cog 252 projects from the shank or stem 231 of the body 230 of the cutter unit. The lug or cog 252 is disposed in the path of movement of the pusher bar 240 so that upon movement of the pusher bar the lug or cog sweeps the cutter 236 of the cutter unit across the rear end of the supported work piece for cutting off the burr. At the same time, the step 248 on the pusher bar 240 effects a downward push on the roller 238 thereby forcing the ratchet bar 220 downwardly thereby leaving the jaws 200 and 202 of the chuck in neutral slightly open position. Continued inward movement of the pusher bar onto the next step 249 will close the jaws within several thousandths of an inch of the work piece diameter and further continued inward movement onto the last step 250 will close the jaws firmly onto the work piece. Further continued inward movement of the pusher bar will cause the edge of the slot 246 to engage the lug or cog 252 on the stem of the cutter unit body whereby the cutter unit with cutter or knife 236 will be moved to sweep across the back face of the work piece to remove the cut-off burr.

Figures 19, 21:
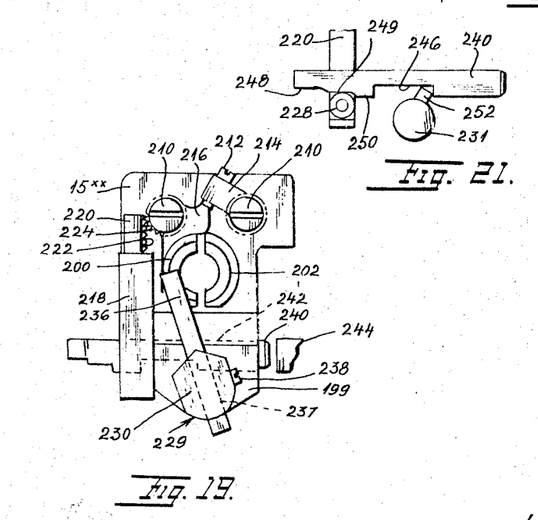
FIG. 19 is a view similar to FIG. 18 but showing the parts in moved position.
FIG. 21 is a view similar to FIG. 20 showing the pusher bar in moved condition.
Figure 20:
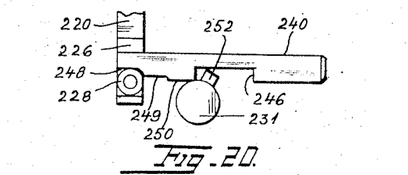
FIG. 20 is a detail view of the pusher bar member of FIG. 18.

Movement of the pusher bar to the step 249 partly closing the jaws of the chuck permits rotation of the work piece to completion of the cut-off, followed immediately by a firm grip of the work piece to complete the burr removal operation.

The pusher bar, vertical rack bar and split chuck jaws automatically return to normal position and repeat operation by means of the spring 240xx on the stem 244 mounted in the end of pusher bar 240 and a spring (not shown) adapted in the same manner to vertical slide rack 220.

Figure 22:
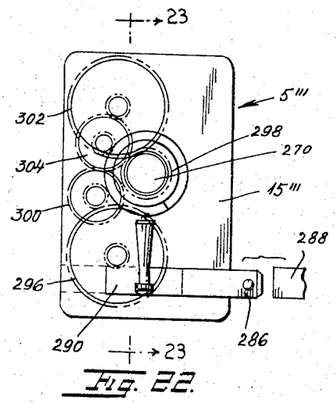
FIG. 22 is a front elevational view of a cutting-off tool embodying a still further modified form of the invention, for back end burr removing and back end operations, for drilling, reaming, counterboring, tapping, etc.
Figure 23:
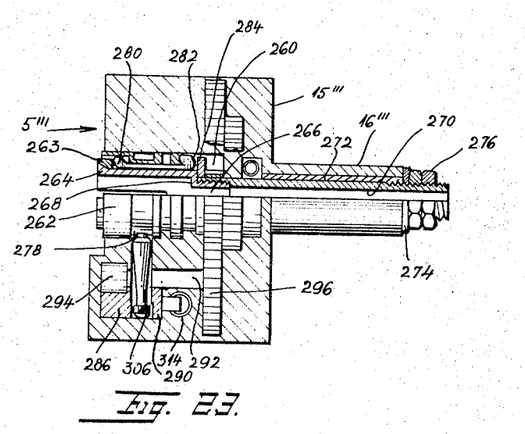
Figure 24:
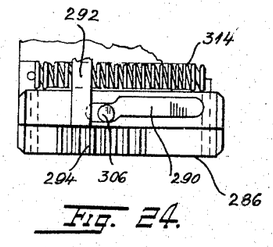
FIG. 24 is a detail elevational view of the retracting mechanism.
Figure 25:
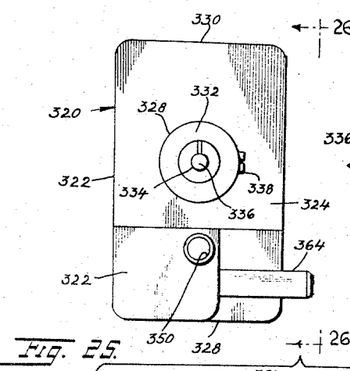
FIG. 25 is a front elevational view of a drilling and tapping tool embodying yet another modified form of the invention.
Figure 26:
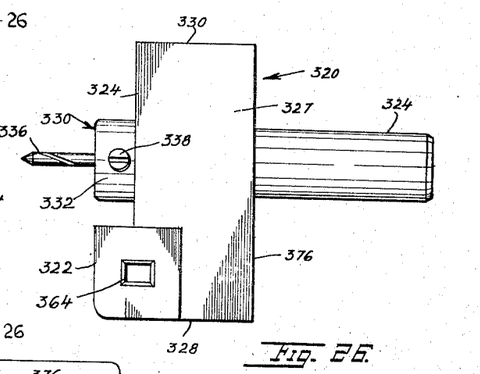
FIG. 26 is a side elevational view thereof as seen from the line 26—26 of FIG. 25.

FIGS. 22 to 24, inclusive, illustrate yet another modified form of revolving tool assembly 5''' for removing cut-off burrs from the back end of the work piece. The tool assembly 5''' comprises a solid block rectangular-shaped body 15''' with a radial shank 16''' at the rear. The body is formed with a central recess 260, intersecting the front thereof. Slidably mounted in the recess, there is a bushing 262 and inside the bushing there is a collet closing sleeve 263 with pivotally mounted lever 280, and in sleeve 263 there is a collet 264. The collet has an externally threaded reduced inner end 266 forming a shoulder 268 thereon. A sleeve 270 extends through the shank 16''' of the tool body. The inner end of the sleeve is threaded on the reduced inner end 266 of the collet 264. A bushing 272 is positioned around the sleeve 270. A washer 274 is placed around the outer end of the sleeve 270 and nuts 276 are threaded on the outer threaded end of the sleeve for adjustably securing the collet. A split ring 278 encircles the bushing 262. The lever 280 is pivotally mounted between the closing sleeve 310 and washer 284. The inner end of the lever 280 is pivoted in a slot formed in closing sleeve 310 and washer 284.

In use, the tool assembly 5''' is advanced over the work piece (not shown). The means for clamping the collet 264 on the work piece and for rotating the collet and work piece comprises a round pusher bar 286 adapted to be actuated by a portion of a fixed guide 288 mounted on a cam-actuated front cross slide (not shown). The pusher bar 286, pin connected, moves a cam track bar 290 simultaneously. A shaft 292 mounts a pinion 294 on one end meshing with the ratchet bar 286 and mounts a spur gear 296 on its other end. A lever 306 has one end interlocked with the cam track bar 290, the other end engaging a split sleeve 278 mounted freely in a groove in bushing 262. Forward movement of the bushing 262 will press on one end of lever 280, the other end of the lever with rocking motion forcing or pressing sleeve 310 against the tapered outer end of the collet 264 thus closing the collet on the work piece. Continued inward movement of the pusher bar 286 will revolve the collet and supported work piece through the gear 296 and connected gearing, whereby the cut-off tool on the machine will be moved to remove the burr at the back end of the work piece. A spring 314 associated with the pusher bar 286 automatically retracts the parts to normal position.

Referring now to the modified form of tool assembly shown in FIGS. 25 to 30, inclusive, herein is shown a revolving tool assembly 320 for drilling or tapping the work piece (not shown). Tool assembly 320 comprises a rectangular-shaped hollow casing 322 having a front wall 324, rear wall 326, side walls 327, bottom wall 328 and top wall 330. The front wall 324 is formed with an enlargement 325 at its bottom end. A stem or shank 325 projects radially from the rear wall 326. Front wall 324 is formed with a round opening 328 bearing supported (not shown) to receive either a drill spindle unit, such as the unit 330 shown in FIG. 30, or a tap spindle unit, such as the unit 332 shown in FIG. 29. The drill spindle unit 330 is shown in operative position in FIGS. 25, 26, 27 and 28.

Figure 30:
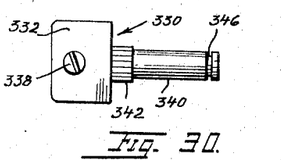
FIG. 30 is a similar view of a drill spindle adapted to be used with the tool of FIG. 25.

This drill spindle unit 330 comprises a cylindrical-shaped block 332 having a socket opening 334 in its front to receive and support a drill element 336. The drill is held in position by a set screw 338. A cylindrical shaft 340 extends rearwardly from the block and fixed on the shaft adjacent the block 332 is a pinion 342. The inner end of the shaft is supported on a bracket 344 fixed to one of the side walls of the casing. An annular groove 346 is formed in the inner end of the shaft to receive a retractable spring 348. A shaft 350 is suitably and rotatably supported in the enlargement 322 of and carried by the shaft is a pinion 352. A spur gear 354 is also carried by the shaft inwardly of the pinion.

Figure 27:
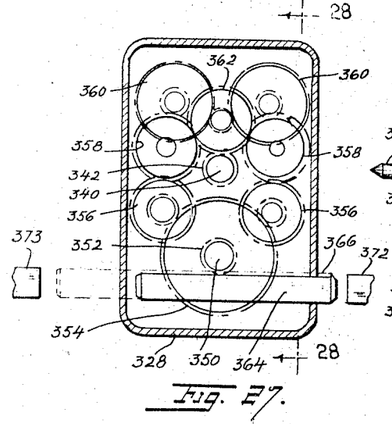
FIG. 27 is a vertical sectional view through the center of FIG. 25, showing the train of gearing diagrammatically.
Figure 28:
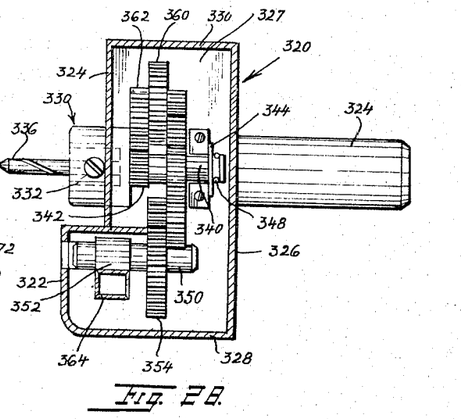

A pair of spaced gears 356, 356 is in mesh with gear 354 and another pair of spaced gears 358, 358 is in mesh with the gears 356, 356. A pair of gears 360, 360 is in mesh with gears 358, 358, and in mesh with gears 360, 360 is a gear 362. Gear 362 drives pinion 342 on drill 336. Shaft 350 is driven by a hollow rack bar 364, the teeth 366 of which engage the teeth of the pinion 342.

The drill 336 is rotated by means of the rack bar 364 slidably mounted in the enlargement 322 of the casing. The rack bar is in mesh with the pinion 352 on shaft 350. The rack bar is actuated by a portion of a fixed guide 372 mounted on a cam-actuated front cross slide (not shown). The bar may also be actuated by a fixed guide 373 on a rear cross slide (not shown). Rotation of shaft 350 rotates the train of gearing and drill shaft pinion 342 operatively connected thereto.

Figure 29:
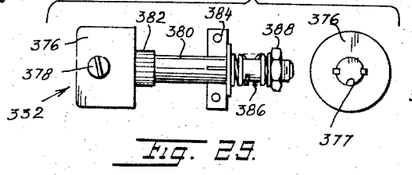
FIG. 29 is a detail elevational view of a tap spindle adapted to be used with the tool of FIG. 25.

In place of the drill unit 330, the tap spindle unit 332 shown in FIG. 29 can be used. Unit 330 consists of a cylindrical-shaped block 376 having a socket opening 377 in its front to receive and support a tap tool member (not shown). A set screw 378 is provided to hold the tap tool member in place. A cylindrical shaft 380 extends rearwardly from the block and fixed on the shaft adjacent the block is a pinion 382. The inner end of the shaft is supported on a bracket 384 adapted to be fixed on one of the side walls of the casing. A retractable spring 386 is sleeved around the free end of the shaft between the bracket 384 and a nut 388 on the end of the shaft, to allow end movement in tapping operations. It will be understood that the drill spindle unit and the tap spindle unit are interchangeable with modified gear changes for speeds.

Forward and reverse drill and tap revolutions compensate for high and low speeds required for these operations in connection with work spindle speeds. Also, with the work spindle stopped, drilling and tapping can be accomplished with tool drill or tap revolving.

Figures 31, 32, 33, 34, 35:
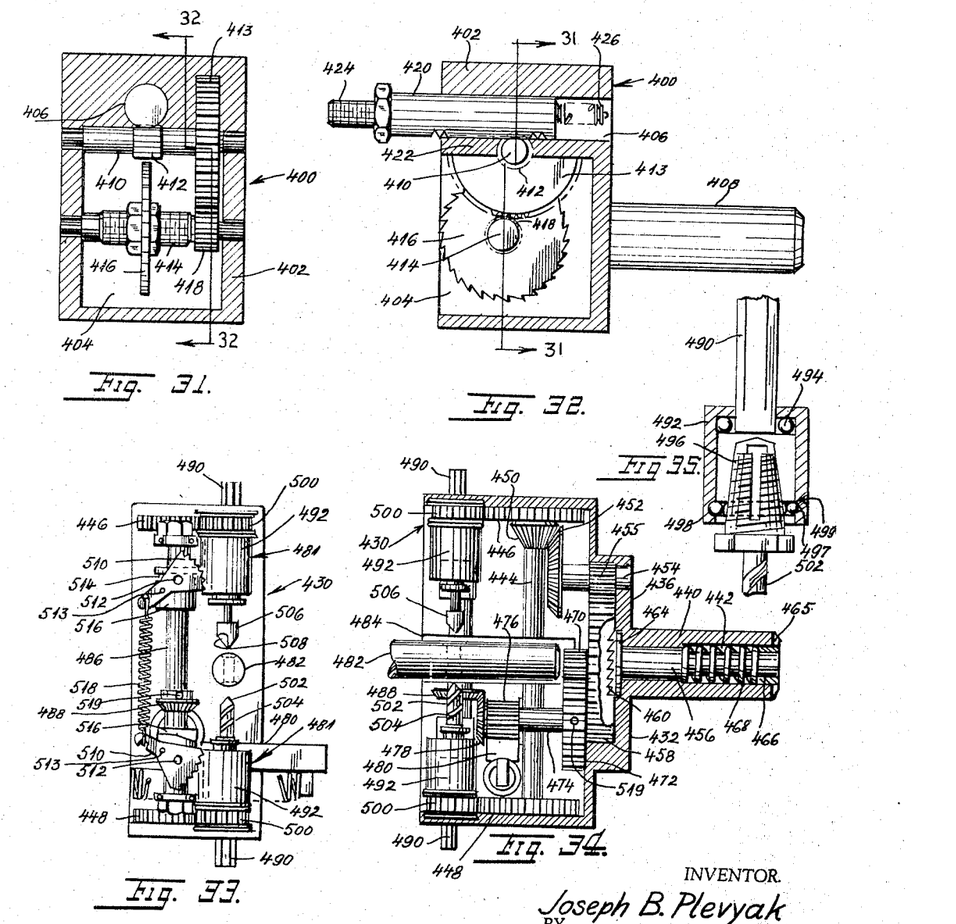

In FIGS. 31 and 32, another modified form of tool assembly 400 is shown for slotting and milling a work piece (not shown). The tool assembly 400 consists of a rectangular-shaped solid block body 402 formed with a compartment 404 opening to the front thereof and formed with a round passage 406 from the front to the rear thereof. A stem or shank 408 extends radially from the rear thereof.

A shaft 410 is journalled in the side walls of the compartment 404 and fixed on the shaft midway its ends is a pinion 412. A spur gear 413 is also fixed on shaft 410 adjacent the rear of the compartment. Another shaft 414 is journalled in the side walls of the compartment below the shaft 410 and offset from the vertical plane of shaft 410. A disc-shaped saw 416 is fixed on shaft 414 midway its ends, and a pinion 418 on its rear end meshing with the gear 413 on shaft 410.

A rack bar 420 is slidably mounted in passage 406, and has teeth 422 of which mesh with the pinion 412. An adjustable pusher bar 424 moves the rack bar.

In use, with the forward movement of the machine turret slide, the pusher bar 424 comes into contact with the machine spindle nose cover (not shown) thereby actuating the ratchet bar and thus rotating the saw 416 for end cutting operations. A retractable spring 426 associated with ratchet bar automatically returns the parts to normal position. With a modification, power to saw can be transmitted from cross slide pusher bar arrangement.

Another modification of the invention is shown in FIGS. 33 to 35, inclusive, in the form of a turret two-spindle cross drilling tool assembly 430. The tool assembly 430 consists of a substantially solid body with an enlargement 432 at the rear thereof. A shank 440 with a central bore 442 extends radially from the rear extension 432. A shaft 444 is journalled in the top and bottom of the body adjacent the rear thereof and fixed on one end of the top end as viewed in FIG. 34 of the shaft, there is a gear 446 and a similar gear 448 is fixed on the opposite end of the shaft. A pinion 450 is fixed on shaft 444 adjacent the gear 446, which meshes with a bevel gear 452 fixed on a shaft 454 journalled in the rear wall 436. A pinion 455 is fixed on shaft 454. A shaft 456 is journalled in the bore of shank 440 and fixed on the end of shaft 456 there is a gear 458 having teeth 460 on the face thereof meshing with teeth on a spring-pressed ratchet 464 on the inner end of the shaft 456. Gear 458 meshes with pinion 455 fixed on shaft 454. A bushing 465 is fitted on the outer end of the bore of shank 440 and interposed between the inner end of the hub 466 of bushing 465 and sleeved around the shaft 456 there is a coil spring 468, one end being seated on a shoulder formed on shaft 456 and its other end impinging against the hub of the bushing 465 thereby urging the toothed disc 464 against the teeth 460 on the gear 458. A pinion 470 is fixed on the inner end of shaft 456 and in mesh with the pinion 470 there is a gear 472 fixed on a shaft 474, the other end of the shaft mounting a pinion 476 and outwardly thereof on the shaft there is a bevel gear 478. A spring-pressed toothed rack 480 disposed at right angles to shaft 474 meshes with pinion 476.

In this form, two spindle assemblies 481 are adapted to operate on a work piece 482 supported in a recess 484 in the body of the tool assembly on opposite sides of the recess 484. A cam shaft 486 is journalled in the casing and extends behind the spindle assemblies and fixed on one end of the shaft 486 there is a bevel gear 488 which meshes with bevel gear 478 on shaft 474.

Each spindle assembly 481 consists of an elongated splined shaft 490 extending outwardly through the adjacent end of the body. A hollow cylindrical casing 492 is rotatably mounted on the end of shaft 490. This mounting consists of a groove or ball race inside the casing at the top thereof providing an outer race, and a groove or race on the exterior of the bottom end of shaft 490 providing an inner race, said races forming a raceway for ball bearings 494, interposed between the shaft and casing. A tapered threaded split nut tool chuck 496 is rotatably mounted in casing 492 and extends outwardly thereof. A raceway is formed inside the casing at the bottom thereof for ball bearings 498 interposed between the split nut tool and the casing. The bottom of the casing is formed with holes 499 disposed at an angle to the horizontal to permit entrance of the ball bearings, and the holes are sealed with plugs 497 to prevent escape of the ball bearings. The ball bearings 498 provide a radial-thrust bearing for the split nut tool. A splined gear 500 is sleeved around the splined shaft 490. The gear 500 on one spindle assembly meshes with the gear 446 on shaft 444, and the other gear 500 meshes with the gear 448 on the other end of the shaft 444. A drill tool element 502 formed with spiral grooves 504 is clamped in the chuck 496 of one spindle assembly, and a drill or tap tool element 506 with a notch 508 is clamped in the chuck 496 of the other spindle assembly.

A pair of complemental gear segments 510, 510 are pivotally connected by means of pins 513, 513 to front of body 434. A compression spring 518 connects both ends of the gear segments for retracting the gear segments. Gear segments 510 are moved by pins 512 riding in grooves of cam lobe 514 formed in cam 516. Gear segments 510 mesh with gear racks formed on spindles 492, providing the in and out movements of the spindles. The bevel gear 458 is driven by bevel gear 478 thereby rotating shaft 486.

In operation, movement of rack pusher bar 480 revolves tool spindles 492 through gears 476 and 472, 470 and 458, 455 and 452, 450 and 446, to gear 500 and revolves cam shaft 486 to produce in and out movements of tool spindles 492, through gear 478 to bevel gear 488. The spring of the rack and pinion assembly 480 disengages the gearing training by means of the ratchet 460.

The cam shaft 486 is rotated independently of the train of gearing and by means of the cams 516 on the shaft 486 and the gear segments 510, the two opposed spindle assemblies 481 are fed in and out of the work simultaneously or alternately. Spring 518 retracts the parts to normal starting position.

Shear pins 519, such as shown protruding from shaft 486 and from shaft 474, are preferably provided to prevent damage in event of excessive pressures or interference with movements of the assembly. These shear pins may be applied to other assemblies and movements.

Figures 36, 37:
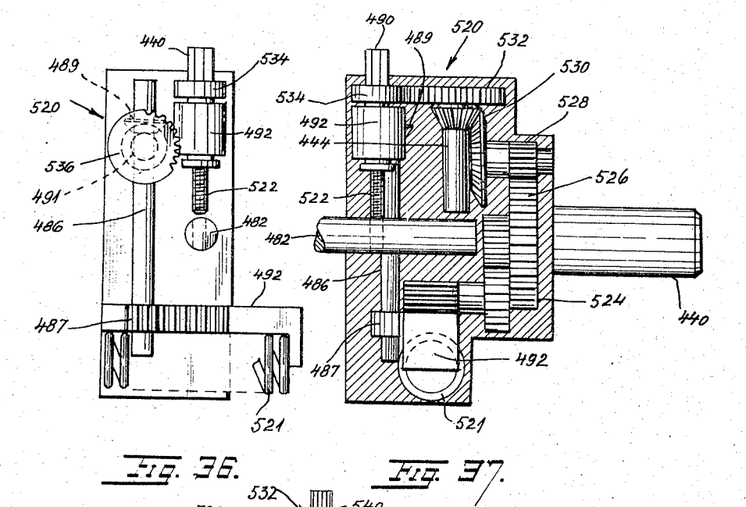
FIG. 36 is a front elevational view of a turret cross tapping tool assembly embodying yet another modified form of the invention, a work piece being shown in position.
FIG. 37 is a side elevational view thereof.

The modified form of turret cross tapping tool assembly 520 shown in FIGS. 36 and 37 differs from the tool assembly 430 of FIG. 34 in that only one spindle assembly is used and no ratchet is provided, such as the ratchet 460, for disengaging the gear train for driving the tap spindle 522. Furthermore, the tap spindle 522 is moved in and out by the gearing 487–489, bevel to 491, bevel and spur 536, instead of by the cam assembly.

In all other respects, the tool assembly 520 is similar to tool assembly 430 of FIGS. 33 and 34 and similar reference numerals are used to indicate similar parts.

In operation, shaft 486 is rotated independently of the train of gearing and by means of the gear assembly 536 feeds the tap spindle 522 on the forward revolutions thereof and draws the spindle back out upon reversing revolutions of the tap spindle, by means of heavy pressure spring 521.

Figure 38:
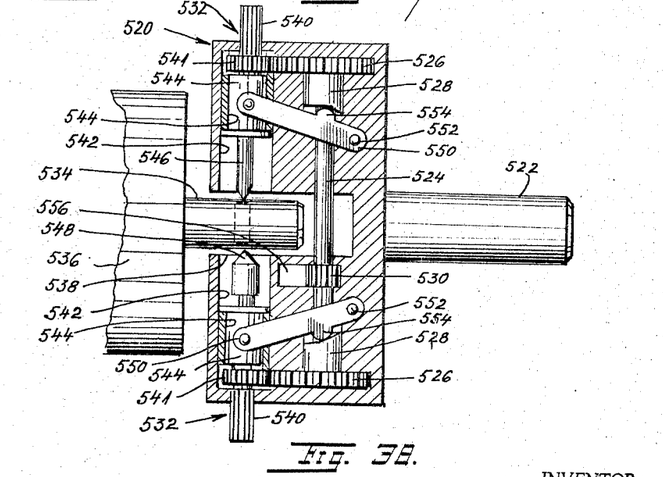
FIG. 38 is a sectional view through the center of a turret cross drilling tool assembly embodying still a further modified form of the invention, a machine spindle and work piece rod being shown in position.

Referring now to the modification of the invention shown in FIG. 38, herein a turret two-spindle cross drilling tool assembly 520 is shown. The tool assembly consists of a substantially solid body with a shank 522 extending radially from the rear thereof. A shaft 524 is suitably rotatably mounted in the body and fixed on both ends of the shaft are gears 526, 526, and inwardly of and adjacent to the gears are cam members 528, 528 on the shaft. A pinion 530 is fixed on the shaft intermediate its ends.

Two spindle assemblies 532, 532 are adapted to operate on a work piece rod 534 supported in a machine spindle 536. The spindle assemblies are disposed on opposite sides of the recess 538 in the body. Each spindle assembly consists of an elongated splined shaft 540 extending outwardly through an opening in the body. A pinion 541 is fixed on each shaft 540 inwardly of the body, in mesh with the adjacent gear 526. A cylinder 542 is formed in the body on each side of the recess in line with the shaft 540 and movable in each cylinder 542 there is a piston 544, and depending from one piston is a detachable drill 546 and upstanding from the other piston is a tap or drill 548. A lever 550 has one end pivotally connected to each piston 544 and with its other end pivotally connected to the body of the tool assembly as indicated at 552. A curved protuberance 554 on one long edge of the lever rides upon the working face of the adjacent cam member 528.

A pusher bar gear rack 556 engages the teeth of pinion 530 and when pushed by an actuating rod the shaft 524 is rotated which mounts gear 526 for rotating spindle assembly 532 and for rotating the cam 528 which moves the pivoted levers 550 in order to move the spindle assemblies with the tools forward and backward into the work piece 534.

Figure 39:
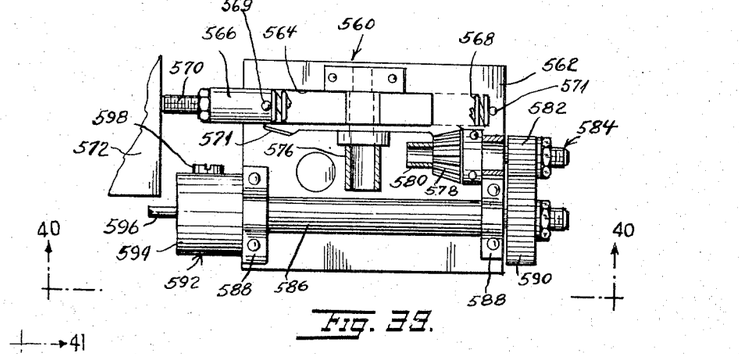
FIG. 39 is a front elevational view of a cross slide drilling and tapping tool, showing a fragment of a machine cover in position, parts being shown in section.
Figures 40, 41, 42:
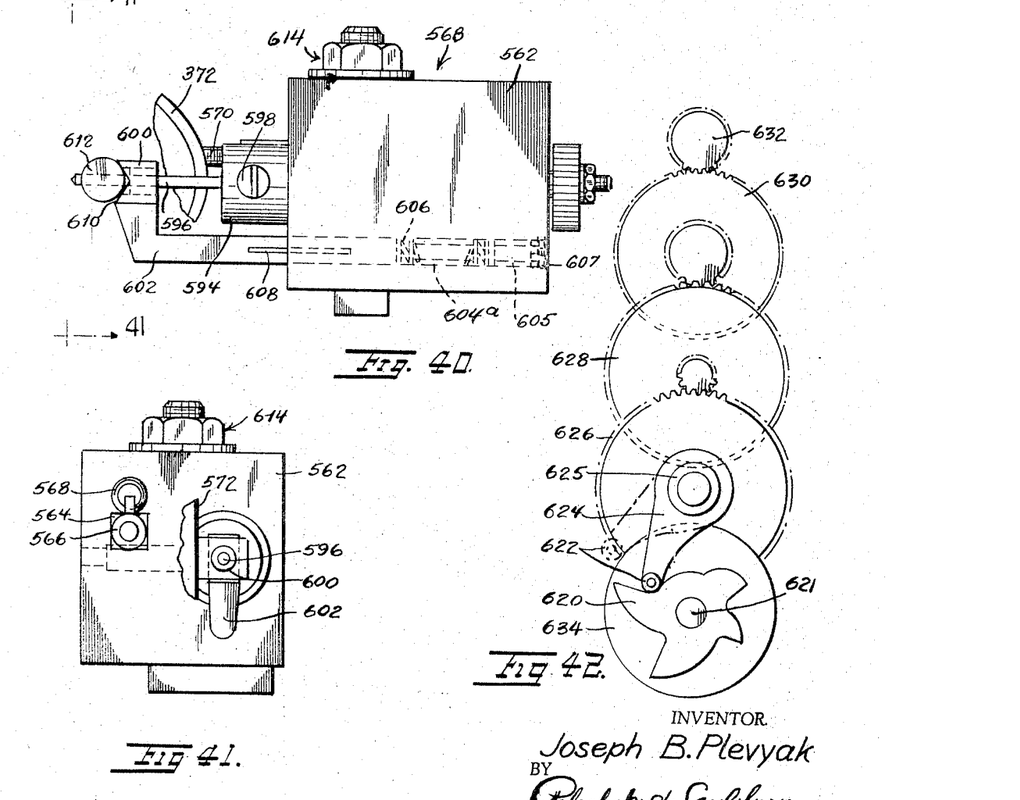

In FIGS. 39 to 41, inclusive, yet another modified form of cross drilling and tapping tool assembly 560 with cross slide is shown. The tool assembly 560 comprises a rectangular-shaped block body or post 562 with a passage 564 therein. A rack bar 566 is slidable in the passage 564 and is pressed outwardly thereof by a coil spring 568 disposed between pin 569 on bar 566 and pin 571 on body 562. An adjustable actuating or pusher bar 570 is carried on the outer end of the rack bar 566 which is adapted to be engaged by the machine spindle cover 572 by forward movement of a cross slide.

A gear 574 fixed on a tubular shaft 576 is operatively connected to the rack bar and movement of the gear is imparted to a bevel gear 578 fixed on a tubular shaft 580 protruding outwardly of the block body. A pinion 582 is fixed on the outer end of shaft 580 and is held in position by a bolt and nut assembly 584.

A shaft 586 is supported parallel to the rack bar 566 and is rotatably supported by bearings 588, the shaft extending beyond both ends of the block body. A gear 590 is fixed on one end of shaft 586 and meshes with the pinion 582 on shaft 580. A spindle assembly 592 is operatively connected to the other end of shaft 586. The spindle assembly includes a cylindrical-shaped block 594 having a socket opening in its front to receive and support a drill 596. The drill is held in position by a set screw 498. A cylindrical bushing member 600 is slidably supported on the drill 596 by means of an elongated angular bracket 602 slidable in a passage 604 in the bottom of the block body. The bracket 602 is pressed outwardly by a coil spring 606 positioned behind the end of the bracket in the passage. An elongated closed slot 608 in the body of the bracket coacts with a pin (not shown) to limit axial movement of the bracket. Slidable bracket 602 is reduced in diameter and this reduced portion moves through bushing 605. A pin 607 pressed into the end of bracket 602 limits the spring-pressed outward movement of bracket 602. The bushing member 600 is formed with a cradle face 610 to engage and support the work piece 612, while being worked upon by the drill 596. The bushing member 600 ensures that the drill 596 will be started in dead center. The block body may be mounted on a support by a bolt and nut assembly 614.

This tool assembly can be designed to drill and tap by an indexing arrangement on the spindle assembly and a gear train adapted to rotate two spindles at 180° angles (not shown).

In FIG. 42, there is shown improved driving mechanism for driving a spindle forwardly and backwardly, such as the spindle movement shown in FIG. 5. This mechanism includes a star-shaped cam 620 on a shaft 621 contacting a cam roll 622 on a cam lever 624. Lever 624 has a sliding ratchet bushing 265 at its supported end, which bushing engages a drive gear 626 in mesh with a gear 628 which in turn is in mesh with gear 630 for turning the machine spindle 632.

Another cam 634 is fixed on shaft 621 and by means of idler gears (not shown) performs the same operation as cam 620 but in reverse.

When the cam roll 622 is lifted to the highest point on the cam 620, the entire cam lever assembly will swing back by spring pressure to the lower point on the cam and through a cam tract (not shown) by sliding contact with a fix pin, the sliding ratchet bushing 625 will disengage from drive gear 626, thus returning the cam lever 624 to a neutral position and ready to repeat the operation with another rise in the lobe of cam 620.

The improved driving mechanism eliminates speed change gears, pulleys, belt, spindle brake, reversing clutches, spindle indexing and the like, and eliminates slippage of spindle revolutions and spindle runs cooler, but allows higher spindle speeds.

Furthermore, my improved spindle driving method insures specific speeds for any operation, forward or reverse. The spindle revolves only in work position and the speed and length of time are determined by design in the cam lobe.

Driving, indexing, stopping and locking of spindle are accomplished in one compact spindle unit (not shown).

Reversing, indexing and stopping of spindle are instantaneous.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A shave tool assembly for cutting off burrs from the back end of a work piece, said tool comprising a plate-like body, means radiating from one side thereof for detachable connection to a turret lathe, a pair of opposed spaced chuck jaws pivotally mounted on the body adjacent the top thereof, a pinion associated with one of said jaws, a shaft rotatably mounted in the body, a knife member carried by said shaft, a slidable rack bar meshing at one end with said pinion, and means for simultaneously moving said rack bar and said knife member, said moving means being adapted to be actuated by a moving part of the turret lathe.

2. A tool assembly for cutting off burrs from the back end of a work piece, said tool comprising a plate-like body, a shank radiating from one side thereof for detachable connection to a turret lathe, a pair of opposed spaced chuck jaws pivotally mounted on the body adjacent the top thereof, a pinion associated with one of said jaws, a shaft rotatably mounted in the body, a cutter member carried by said shaft, a first spring-pressed vertical slidable rack bar meshing at one end with said pinion, said rack bar having a slot in its other end, a roll in said slot, a second slidable rack bar having a stepped end engaging said roll, said second rack bar having a notch in a long edge thereof and a lug radiating from said shaft coacting with the edge walls of the notch in the rack bar, and one of said rack bars being adapted to be actuated by a moving part of the turret lathe.

3. A tool assembly for cutting off burrs from the back end of a work piece, said tool comprising a plate-like body, a shank radiating from one side thereof, a pair of opposed spaced chuck jaws pivotally mounted on the body adjacent the top thereof, a pinion associated with one of said jaws, a shaft rotatably mounted in the body, a cutter member carried by said shaft, a first spring-pressed slidable rack bar meshing at one end with said pinion, said rack bar having a slot in its other end, a roll in said slot, a second spring-pressed slidable rack bar having a stepped end engaging said roll, said second rack bar having a notch in a long edge thereof and a lug radiating from said shaft coacting with the edge walls of the notch in the rack bar, and screw means extending between the chuck jaws for adjusting the relative positions of the chuck jaws.

4. A tool assembly as defined in claim 1 characterized by spring retractable means associated with the rotatable shaft.

References Cited

UNITED STATES PATENTS

| | | | |
|---|---|---|---|
| 2,089,078 | 8/1937 | Tyson | 82—16 |
| 3,062,080 | 11/1962 | Poorman | 82—24 |

RICHARD H. EANES, Jr., *Primary Examiner.*

FRANK E. BAILEY, TRAVIS R. McGEHEE,
*Examiners.*